United States Patent [19]

Rogers

[11] Patent Number: 5,039,036
[45] Date of Patent: Aug. 13, 1991

[54] ENERGY ABSORBING AIR DROP PALLET

[76] Inventor: Roy K. Rogers, 26575 Barns, Roseville, Mich. 48066

[21] Appl. No.: 580,690

[22] Filed: Sep. 11, 1990

[51] Int. Cl.$^5$ .............................................. B64D 1/14
[52] U.S. Cl. ............................... 244/138 R; 244/137.3
[58] Field of Search ................ 244/137.3, 138 R, 142; 188/129, 166, 268, 271; 54/62

[56] References Cited

U.S. PATENT DOCUMENTS

| | | | |
|---|---|---|---|
| 2,587,448 | 2/1952 | Eakin | 244/138 R |
| 3,010,540 | 11/1961 | Dahlin | 244/138 R |
| 3,117,752 | 1/1964 | Gillmore | 244/138 R |
| 3,181,821 | 5/1965 | Webb | 244/138 R |
| 3,195,686 | 7/1965 | Johnson | 244/138 R |
| 3,387,805 | 6/1968 | Barnett et al. | 244/138 R |
| 4,779,824 | 10/1988 | Leger | 244/137.3 |

FOREIGN PATENT DOCUMENTS

| | | | |
|---|---|---|---|
| 467259 | 8/1950 | Canada | 244/138 R |
| 2373392 | 8/1978 | France | 244/138 R |

Primary Examiner—Joseph F. Peters, Jr.
Assistant Examiner—Carla Mattix
Attorney, Agent, or Firm—Peter A. Taucher; David L. Kuhn

[57] ABSTRACT

The invention is a carrier for use in air dropping cargo from an aircraft, the carrier comprising a pallet suspended from a parachute. The pallet has struts which absorb shock and prevent cargo roll over when the pallet lands, the struts being deployed into a shock absorbing, anti-roll-over position by the drag of the parachute when it opens. The pallet includes shock absorbing supports between its upper and lower surfaces to further protect air dropped cargo upon landing.

3 Claims, 2 Drawing Sheets

ENERGY ABSORBING AIR DROP PALLET

GOVERMENT INTEREST

The invention described herein may be manufactured, used, and licensed by or for the U.S. Government for governmental purposes without payment to me of any royalty thereon.

BACKGROUND AND SUMMARY

One of the problems encountered when parachuting or air dropping supplies is impact damage to the air dropped material when it hits the ground. A particular problem experienced by the U.S. Army during air drop operations is the rolling over of palletized cargoes such as artillery guns or vehicles once these cargos strike the ground.

My invention is an air-drop cargo carrier having a pallet whose design enhances its ability to absorb impact shock and deter rolling over of palletized loads. The components of my carrier which enhance these abilities take virtually no cargo space of an aircraft and the weight of these components is negligible compared to the weight capacity of the pallet.

The pallet has struts which deploy outward and downward from the pallet to absorb impact shock and inhibit cargo roll over. The carrier also has a mechanism for using the upward force on the parachute lines to effect strut deployment when the parachute opens. The pallet has elongate supports of reinforced elastomeric material, which deform in a controlled manner to absorb impact shock when the pallet lands.

DETAILED DISCLOSURE

Figure 1:
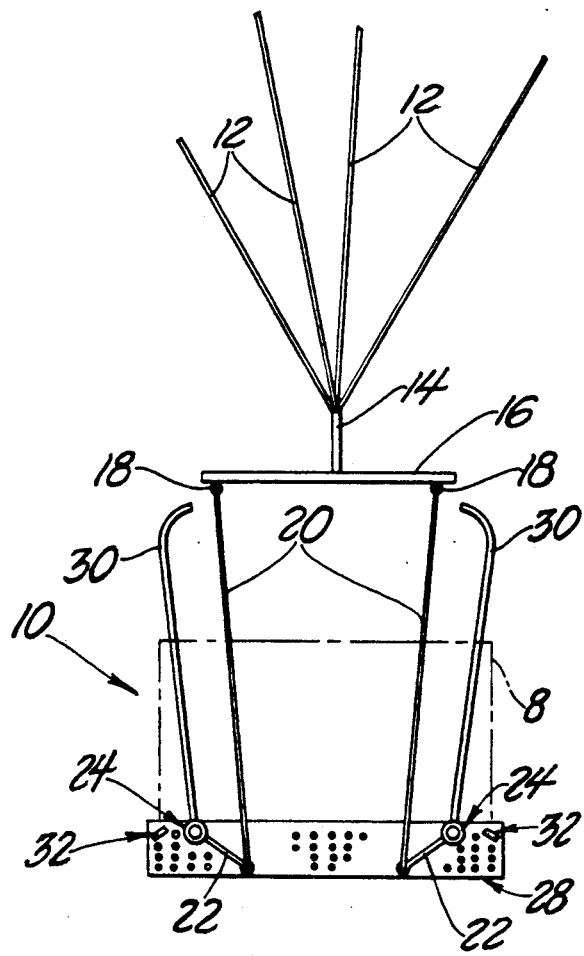
FIG. 1 is a side elevational view of an air drop carrier, the parachute being omitted for convenience.
Figure 2:
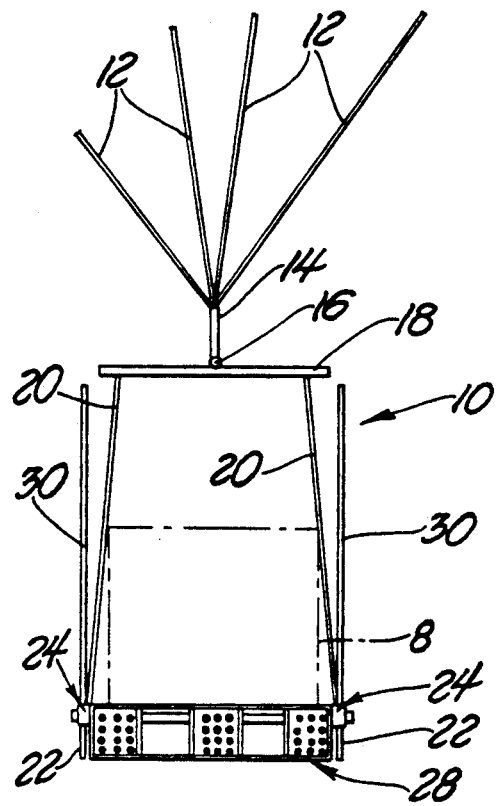
FIG. 2 is an end elevational view of the air drop carrier, the parachute again being omitted for convenience.

Shown in FIGS. 1 and 2 is an improved carrier 10 for an air-dropped cargo or load 8, the carrier being suspended from lines 12 of a set of parachutes (not shown). Lines 12 attach at their lower ends to a short vertical post 14 fixed normally to spacer bar 16, there being two cross bars 18 perpendicularly attached at the ends of the spacer bar to form an H-like spider frame therewith. At the ends of cross bars 18 are attached the upper ends of cables 20, the cables being secured at their lower ends to levers 22, which in turn are fixed to axle head assemblies 24. Assemblies 24 are fixed to the ends of shafts or axles 26 (FIG. 4) rotatably mounted in pallet 28. Axles 26 will rotate about their longitudinal axes, so that head assemblies 24 and levers 22 will also rotate about these axes when cables 20 pull upward on levers 22. Fixed to head assemblies 24 and forming obtuse angles with levers 22 are deployable struts 30, which rotate in concert with the levers. The struts and levers preferably define an angle of between 90 degrees and 180 degrees with one another.

Figure 6:
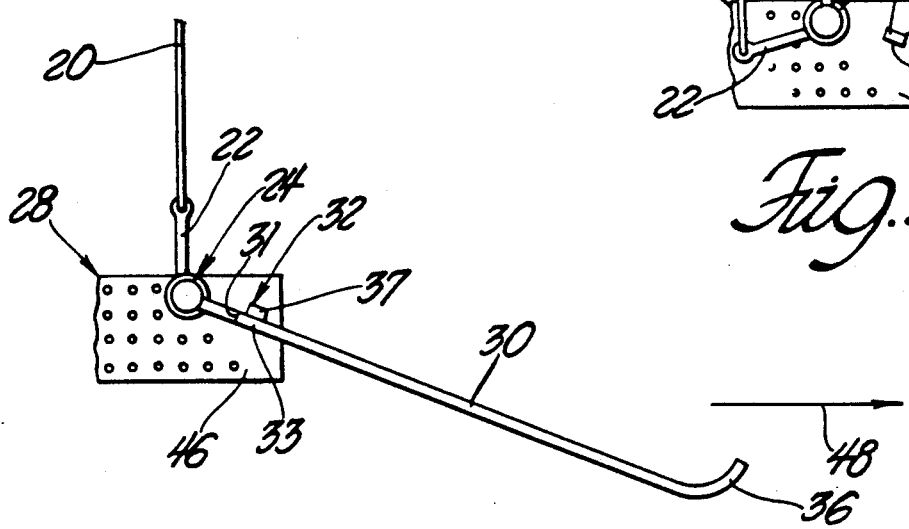

Struts 30 can be rotated from their essentially vertical undeployed position of FIG. 1 to a deployed position where the struts extend outward and downward from pallet 28, as demonstrated in FIG. 6. Once strut 30 reaches the FIG. 6 position, it is prevented from rotating upward by a suitable means such as keeper 32, whereby strut 30 absorbs shock when carrier 10 arrives at landing surface 34. It is contemplated that the strut will strike surface 34 with its curved foot 36, which is the portion of the strut most distal from pallet 28. It is preferred that strut 30 be made of flexible material so that the strut will act as a cantilever spring once foot 36 strikes the ground.

When carrier 10 is descending toward surface 34, it may also have a horizontal component of motion 48 because of wind conditions at the time of the air drop. This horizontal component of motion results in a tendency of the carrier and its load to tilt in the direction of the horizontal component when the carrier strikes surface 34. Because of the shock absorbing qualities of pallet 28, which are discussed later, it is preferred that pallet be tilted as little as possible relative to surface 34 when carrier 10 strikes this surface. The curved feet 36 alleviate this problem by causing strut 30 to act similar to a runner on a sled, so that the leading edge of carrier 10 34 does not dig into surface and instead the carrier 10 slides horizontally over the surface. The strut's contact with the ground also tends to return the pallet to a level position, thereby inhibiting roll over of the pallet and cargo upon landing.

Figure 4:
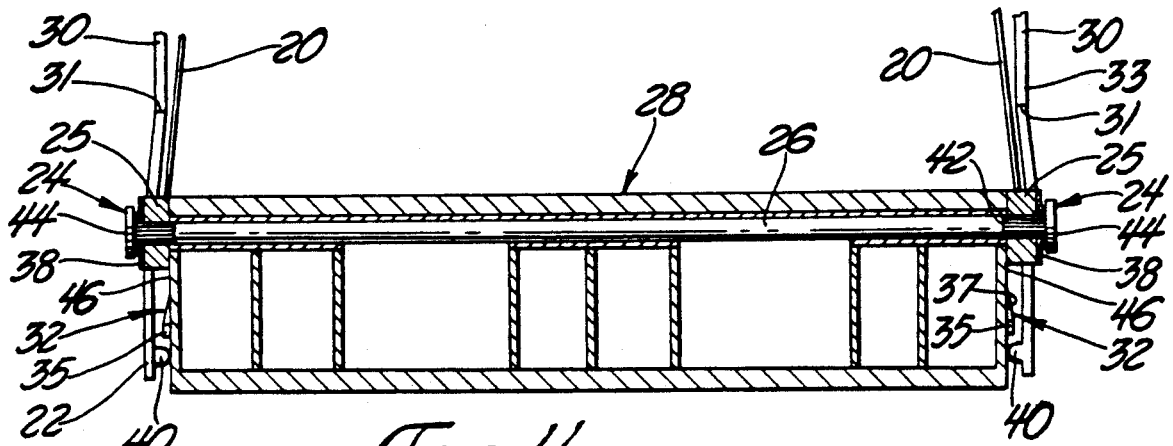
FIG. 4 is sectional end view of the pallet showing further internal structure of the pallet and showing elements of the strut deployment mechanism.
Figure 5:
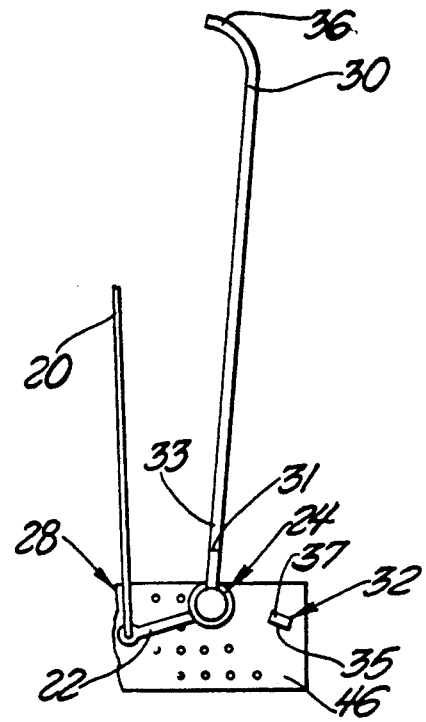
FIGS. 5 and 6 show the undeployed and deployed positions, respectively, of the strut.

Further details of head assembly 24 are shown in FIG. 4. Disposed on axle 26 between internally toothed hub 25 and axle end 44 is an annular spring 38, which can be a bellville washer. Splines 42 at the ends of axle 26 are complimentary with the internal teeth of the hubs 25, whereby the hubs can translate along the ends of the axle. When strut 30 rotates from its FIG. 5 position to its FIG. 6 position, an engagement zone 33 adjacent elbow 31 of the strut follows a rotational path. As zone 33 travels along this path, it engages camming surface 37 on the outboard side of keeper 32. Zone 33 slides against the camming surface so that strut 30 and hub 25 translate outboard from the pallet, whereby spring 38 is compressed. After engagement zone 33 passes keeper 32, spring 38 snaps hub 25 and strut 30 inboard so that engagement zone 33 translates inboard along blocking surface 35 of keeper 32. Engagement zone 33 arrives at a position immediately below and abutting surface 35 and immediately adjacent outboard side 46 of the pallet. As seen in FIG. 6, keeper 32 then prevents strut 30 from rotating counterclockwise and tension on cable 20 will prevent clockwise rotation of the strut until pallet 28 impacts surface 34. To keep strut 30 and head assembly 24 in their FIG. 5 positions until the parachute is deployed, a flexible contact boss 40 frictionally engages the outboard sidewall 46 of the pallet during the FIG. 5 position.

Figure 3:
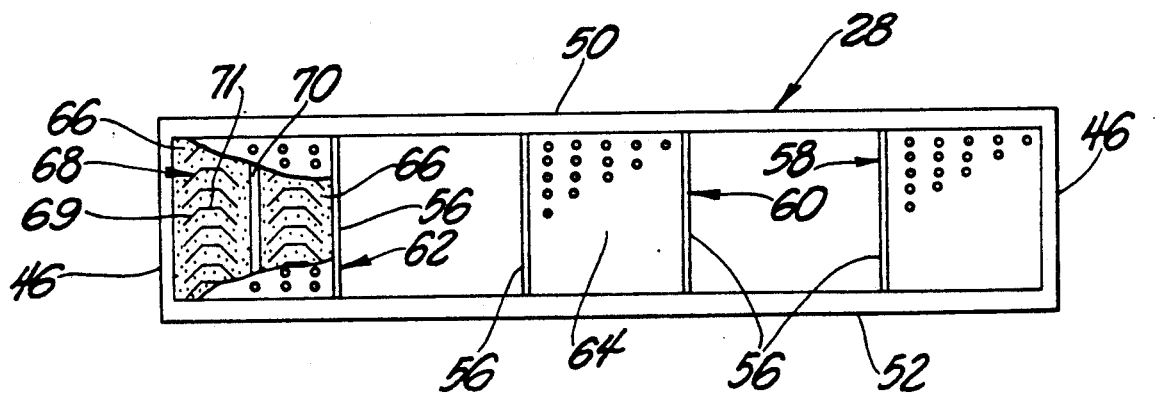
FIG. 3 is an end elevational view of the pallet of the air drop carrier, a part of the pallet being removed to show the interior structure of a pallet support.

FIG. 3 is a partial sectional end view of pallet 28 showing the structural details thereof. Pallet 28 has a top or upper surface 50, a bottom or lower surface 52 and flexible sidewalls 46. Between the top and bottom of pallet 28 and extending along the length thereof are elongate supports 58, 60 and 62, each support having a perforated end panel as at 64 which allow passage of air. Although omitted for convenience from FIG. 3, there are air passing perforations in sidewalls 46 and flexible internal walls 56 of the supports as well. The spaces between the supports are preferably wide enough to admit the forks of a lift truck or similar utility vehicle.

Part of the perforated end panel of support 62 is removed to show the inner structure of the supports. A median wall 70 extends the length of support 62, separating the support into two cavities filled with an open-celled elastomeric material 66. Embedded within elastic material 66 are downwardly open reinforcement channels 68 whose sidewalls 69 extend divergingly, obliquely away from the channel's horizontal web 71 which connects the sidewalls.

Pallet 28 is subjected to a vertical compressive load when carrier 10 impacts landing surface 34, such that elastomeric material 66 will be compressed. Since the elastomeric material is open celled, air will escape from it when it is compressed. The rate of air escape is limited by the restricted size of the orifaces in the end panels 64, sidewalls 46 and end panels 56. Also as a result of the vertical compressive load, sidewalls 46 and internal walls 56 will buckle away from the bodies of elastomeric material 66, so that the material will tend to flow toward these walls. Channels 68 stiffen the bodies by inhibiting this flow of the elastomeric material. As the bodies become increasingly compressed, the channels are forced vertically closer together so that the sidewalls of one channel become more horizontally aligned with sidewalls of a neighboring channel, whereby flow of the elastomeric material between any two channels is restricted. During vertical compression, the channel sidewalls also inhibit horizontal expasion of the elastomeric material disposed within the channels.

I wish it to be understood that I do not desire to be limited to the exact details of construction shown and described herein since obvious modifications will occur to those skilled in the relevant arts without departing from the spirit and scope of the following claims.

What is claimed is:

1. A carrier for use in air dropping a cargo to a selected site, comprising:
   a parachute;
   a frame;
   lines connecting the parachute to the frame;
   a pallet;
   cables connecting the frame to the pallet;
   a longitudinal support in the pallet;
   an elastomer matrix in the longitudinal support;
   the support being within flexible walls wherein at least one of the flexible walls defines passages therethrough;
   deployable struts mounted on the pallet, the struts movable between a first position where the struts extend upward from the pallet and a second position where the struts extend out from the pallet;
   deployment means for moving the struts from the first position to the second position upon opening of the parachute;
   a keeper means for retaining the strut in the second position, the keeper means comprising a keeper engagement zone on the strut, the engagement zone travelling in a path when the strut moves from the undeployed position to the deployed position;
   a keeper member on the pallet, the keeper member having a camming surface in the path of the engagement zone;
   means for biasing the engagement zone against the camming surface as the engagement zone passes the camming surface;
   a blocking surface on the keeper member oriented at an acute angle with the camming surface, the biasing means moving the engagement zone away from the camming surface along the blocking surface after the engagement zone passes the camming surface.

2. A carrier for air dropping a cargo, comprising:
   a parachute;
   a frame;
   lines connecting the parachute to the frame;
   a pallet;
   cables connecting the frame to the pallet;
   a longitudinal support in the pallet;
   an elastomer matrix in the longitudinal support;
   the support being within flexible walls wherein at least one of the flexible walls defines passages therethrough;
   deployable struts mounted on the pallet, the struts movable between a first position where the struts extend upward from the pallet and a second position where the struts extend out from the pallet;
   deployment means for moving the struts from the first position to the second position upon opening of the parachute;
   a shaft rotatably mounted in the pallet, an end of the shaft protruding from the pallet;
   a lever connected between one of the cables and the shaft such that tension on the cable rotates the lever and shaft together;
   wherein the lever is in a generally vertical orientation when the parachute and the strut are deployed, whereby tension in the cable inhibits movement of the strut from the second position.

3. A carrier for parachuting a cargo to a selected location, comprising:
   a parachute;
   a frame;
   lines connecting the parachute to the frame;
   a pallet;
   cables connecting the frame to the pallet;
   a strut rotatably mounted to the pallet;
   a lever connected between one of the cables and the strut such that the strut and lever rotate together;
   wherein the lever is in a generally vertical orientation when the parachute and the strut are deployed;
   an axle rotatably mounted in the pallet;
   ends of the axle protruding from the pallet;
   a hub at each of the ends of the axle, the hubs being rotationally fixed relative to the axle and being axially translatable along the end of the axle, the strut being fixed to the hub, whereby the strut and hub axially translate together and the strut follows a path controlled by the hub;
   a keeper means in the path of the strut for catching the strut when the parachute and the strut are deployed;
   spring means on the end of the axle for biasing the hub and strut in a first axial direction;
   a camming surface on the keeper means translating the strut in a second axial direction which is opposite to the first axial direction.

* * * * *